US011926333B2

(12) United States Patent
Peake et al.

(10) Patent No.: US 11,926,333 B2
(45) Date of Patent: Mar. 12, 2024

(54) COMPENSATORY ACTIONS FOR AUTOMATED FARMING MACHINE FAILURE

(71) Applicant: Blue River Technology Inc., Sunnyvale, CA (US)

(72) Inventors: John William Peake, Mountain View, CA (US); James Patrick Ostrowski, Mountain View, CA (US); Erik Ehn, Sunnyvale, CA (US); Kent Michael Anderson, Signal Mountain, TN (US); Benjamin Ray Chostner, San Francisco, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 99 days.

(21) Appl. No.: 17/564,063

(22) Filed: Dec. 28, 2021

(65) Prior Publication Data
US 2023/0202495 A1   Jun. 29, 2023

(51) Int. Cl.
*B60W 50/035* (2012.01)
*B60W 50/02* (2012.01)
(Continued)

(52) U.S. Cl.
CPC ...... *B60W 50/035* (2013.01); *B60W 50/0205* (2013.01); *G06T 7/0004* (2013.01);
(Continued)

(58) Field of Classification Search
CPC ............. B60W 50/02; B60W 50/0205; B60W 50/0225; B60W 50/023; B60W 50/029;
(Continued)

(56) References Cited

U.S. PATENT DOCUMENTS

2015/0338848 A1   11/2015   Kumar et al.
2018/0025560 A1*   1/2018   Matsuzaki ............. G07C 5/008
                                                            701/23
(Continued)

FOREIGN PATENT DOCUMENTS

DE   102017222545 A1   6/2019
EP       3264892 A1    1/2018

OTHER PUBLICATIONS

European Patent Office, European Search Report and Written Opinion, European Patent Application No. 22210366.5, dated May 23, 2023, 9 pages.

*Primary Examiner* — Russell Frejd
*Assistant Examiner* — Brandon Z Willis
(74) *Attorney, Agent, or Firm* — Fenwick & West LLP

(57) ABSTRACT

As a farming machine travels through a field of plants, the farming machine operates in a normal operational state to perform one or more farming operations. The farming machine detects an operational failure of a component of the farming machine using measurements obtained from one or more sensors coupled to and monitoring the farming machine. The operational failure of the component impacts performance of a first farming operation of the farming operations. The farming machine configures the farming machine to operate in a remedial operational state. In the remedial operational state, the farming machine diagnoses the operational failure of the component using the obtained measurements. In the remedial operational state, the farming machine selects a solution operation to address the operational failure of the component based on the diagnosis. The farming machine performs the determined solution operation.

20 Claims, 10 Drawing Sheets

(51) Int. Cl.
*G06T 7/00* (2017.01)
*G07C 5/08* (2006.01)

(52) U.S. Cl.
CPC ......... *G07C 5/085* (2013.01); *B60W 2300/15* (2013.01); *B60W 2420/42* (2013.01); *G06T 2207/30164* (2013.01)

(58) Field of Classification Search
CPC .. B60W 50/032; B60W 50/035; B60W 50/04; B60W 2050/021; B60W 2050/0215; B60W 2050/022; B60W 2050/0292; B60W 2050/0295; B60W 2050/0297; B60W 2300/15; B60W 2300/152; B60W 2300/154; B60W 2300/158; B60W 2420/42; B60W 2420/403; G06T 7/0004; G06T 7/0002; G06T 2207/30164; G06T 2207/30188; G07C 5/0816; G07C 5/0825; G07C 5/085
See application file for complete search history.

(56) References Cited

U.S. PATENT DOCUMENTS

| | | | |
|---|---|---|---|
| 2018/0050704 A1* | 2/2018 | Tascione | B60W 10/04 |
| 2020/0114843 A1* | 4/2020 | Foster | G07C 5/0825 |
| 2021/0251128 A1* | 8/2021 | Rupp | A01C 5/064 |
| 2021/0321568 A1 | 10/2021 | Garton et al. | |
| 2022/0084333 A1* | 3/2022 | Kraus | B60Q 9/00 |
| 2022/0269282 A1* | 8/2022 | Ascherl | G05D 1/0253 |

* cited by examiner

| Component | Failure | Remedial State (Diagnosis) | Recovery |
|---|---|---|---|
| SPRAYER | | | |
| Y-Drop | Snag/broken | Camera | |
| Nozzle | Clogged Tip | Pressure sensor, camera | Increase pressure in nozzle to clear out clog / actuate nozzle quickly |
| Nozzle | Wrong Nozzle / Nozzle Tip | Camera, Nozzle ID | |
| Nozzle | Wrong Nozzle angle/placement | Camera | |
| Nozzle | Fails to close completely | Pressure / flow rate sensor | Actuate nozzle to see if it will close / resolve itself |
| Pump | Fails to pressurize | pressure sensor | |
| Wheels | Too fast | Camera | |
| Wheels | Cannot Traverse Terrain | Camera, wheels, engine system | reroute |
| Wheels | A wheel keeps functionality | control system - cannot move as expected | |
| Tank | Decreasing too fast | scale (weight) | Decrease pressure |
| Tank | Leak | scale (weight) - changes while closed | |
| Tank | Decreasing too slow | scale (weight) | Increase rate of release (e.g., expand aperture or increase pressure) |
| Tank | Weight imbalance | scale (weight) | redistribute fluid |
| Camera | Broken/no input | System computer | |
| Camera | occluded (e.g. dust/mud) | Camera | spray camera with water / move camera or other component to free the camera |
| Camera | loose | | |
| Camera | wrong frame rate | | |
| Camera | missing/dropped frames | | |
| Camera | Out of alignment | Camera-to-camera | Trigger alignment procedure (maybe at rendering station) |
| Fuel | Low on fuel | Fuel gauge | |
| Lights | Lights go out (e.g. nighttime) | Camera | |
| Solenoid Valve | Stuck or Slow | Pressure sensor | Increase pressure to clear out clog |
| Valve | Wrong flow or none at all | Pressure sensor | |
| Cable | Caught on something | Camera | move farming machine to free cable |
| Cable | Wrong port | | Trigger alignment procedure (maybe at rendering station) |
| Cable | unplugged | | |
| Sensor (any) | timeout / transmit speed too slow | software to measure link quality | |
| Sensor (any) | fails to detect / impossible data / power failure | control system - detected input | |
| Height sensor (e.g. boom) | covered by something | | |
| Computer | performed slower than too slow | control system - computer | |
| Computer | Timing out regularly | comms are timing out | |
| Computer | down | control system | |
| Engine | overheating | temperature sensor | allow to cool |
| Actuator | limited range | | |
| Actuator | hydraulic leak | | |
| Actuator | pinching another component (e.g. cables) | | |
| Actuator | degraded range joint | | |
| Joint | moving beyond specified range (e.g. joint for yaw but seeing pitch) | Camera | |
| Pipe | Clogged | Pressure sensor | Increase pressure to clear out clog |
| Boom/wings/arms | Not moving correctly / limited range | Camera | Dislodge sequence of movements |
| Boom/wings/arms | Stuck on something | Pressure sensor | Increase pressure to clear out clog |
| Tube | Clogged | Camera | Dislodge sequence of movements |
| Hose | snagged | | |
| TILLER | | | |
| Shank | breaks/knocked away | Camera | |
| Plow/Chisel Cultivator/Harrow | breaks/knocked away | Camera | |
| Plow/Chisel Cultivator/Harrow | Plug | | Reverse / lift and shake to try to free plug |
| SEEDER | | | |
| Seed line | clogged | | Increase pressure |
| Planter | too many seeds at once | | Change pressure |
| Row Unit | Too wide/narrow | | |

FIG. 7A

| Redundancy | Reduced | Unsalvageable (all): return to designated location and/or request repairs |
|---|---|---|
| expand range of adjacent nozzle; change flow rate or fluid pressure | second pass using section of boom / stop | |
| extend range of adjacent nozzle, adjust angle of boom | second pass using different nozzle | |
| determine whether can finish job with drip | second pass using different nozzle | |
| | slow down | perform different function using nozzle |
| Change target speeds; work in other areas | reprioritize other tasks | |
| wait until dry/evaporate | | |
| Determine whether can accommodate range of motion / switch to different driving mode e.g. from 4wd to rear-wheel drive | Reprian for partial job completion / early refill | |
| Determine whether can finish job at this rate | slow down to accommodate decreased flow | |
| | slow down | |
| use adjacent camera / spray entire area | second pass using different camera | |
| use adjacent camera / spray entire area | second pass using different camera | |
| use adjacent camera / spray entire area | second pass using different camera | |
| use adjacent camera / spray entire area | second pass using different camera | |
| use adjacent camera / spray entire area | second pass using different camera | |
| determine whether can finish job at this rate | wait until moving | |
| use adjacent camera / spray entire area | second pass using different camera | |
| | second pass using section of boom | |
| | second pass using different camera | |
| wait for computer to come back up | switch models, slow down | |
| | switch models, slow down | |
| | reprioritize other tasks that do not use sensor | |
| | second pass using section of boom | |
| | second pass using section of boom | |
| | resume to accommodate range of motion | |
| | second pass using section of boom | |
| | slow down | |
| | second pass using different section of planter | |
| | second pass using different portion of planter | |

FIG. 7B

COMPENSATORY ACTIONS FOR AUTOMATED FARMING MACHINE FAILURE

TECHNICAL FIELD

The described subject matter generally relates to farming technology, and, in particular, to automatically addressing problems with the normal operation of a farming machine.

BACKGROUND

Conventional farming machines for treating crops in a field are controlled by human operators. Currently, some operations may be computer-assisted, but human control is a prevailing reality of farming machines, and those farming machines with automated functionality encounter frequent issues that prevent normal operation. Attempts to automate farming machines encounter frequent failures, often due to the sometimes-harsh conditions under which farming machines operate.

Unexpected failures in farming machines, particularly autonomous machines, can lead to performance issues when implementing farming operations. That is, if an autonomous farming machine is in use to perform tasks, failure of one or more components of the autonomous farming machine can prevent the successful completion of one or more tasks. This can cause significant delays to performance of farming operations, particularly if not caught until the machine returns from the field. It can be difficult and time consuming to fix an autonomous farming machine that failed during the performance of a task, and it can be difficult and time consuming to rectify damage done to a field or crops therein by the farming machine. Some autonomous farming machine failures are easily fixed or worked around, yet the autonomous farming machine may cease operation until a technician addresses the failure, which can waste a significant amount of time and delay the performance of tasks by the autonomous machine.

SUMMARY

As a farming machine travels through a field of plants, the farming machine operates in a normal operational state to perform one or more farming operations, such as applying herbicide to weeds, or pesticide to crops. A component of the farming machine may break or become damaged while in operation. The farming machine detects an operational failure of the broken or damaged component using measurements obtained from one or more sensors coupled to and monitoring the farming machine. The operational failure of the component impacts performance of a first farming operation of the farming operations (e.g., applying herbicide to weeds). The farming machine may detect the operational failure of the component by analyzing data received from a camera of the farming machine.

If a failure occurs, the farming machine configures the farming machine to operate in a remedial operational state. While configured in the remedial operational state, the farming machine may cease performance of the farming operations and/or cease travel through the field. In the remedial operational state, the farming machine (1) diagnoses the operational failure of the component using the obtained measurements, (2) selects a solution operation to address the operational failure of the component based on the diagnosis, and (3) performs the determined solution operation. Diagnosing the operational failure of the component using the obtained measurements may involve the farming machine referencing a data store that indexes operational failures and respective potential solution operations when determining the solution operation. The determined solution operation may include performing a sequence of potential solution operations to the operational failure of the component in a preset order until the operational failure of the component is resolved. The farming machine may verify the determined solution operation resolved the operational failure of the component and configure the farming machine to operate in the normal operational state.

If no solution operation works, the farming machine may return to a designated location, e.g., a designated location outside the field. "Outside the field" may, in an embodiment, be any area of land that is not part of the contiguously planted region in which the farming machine is operating. Depending upon the embodiment, the designated location may be a particular set of geographic coordinates, which may be set by an administrator of the farming machine; a closest designated location of a plurality of designated locations, as determined based on a current location of the farming machine; a nearest location on a perimeter of the field, or as close to the perimeter as possible given the state of the farming machine (e.g., in view of the one or more operational failures); a conditionally-defined location, such as a location at the end of a current row of the field, or as close to the end of the row as the farming machine can reach; a closest point of high ground (e.g., a local maxima for ground level elevation within the range of the farming machine 100); or so on.

The farming machine may perform the determined solution operation in the remedial operational state by (1) configuring the farming machine to operate in a recovery operational state, in which the farming machine resolves the operational failure of the component by fixing the component; (2) configuring the farming machine to operate in a redundancy operational state, in which the farming machine resolves the operational failure of the component by employing other components of the farming machine to perform the first farming operation; and/or (3) configuring the farming machine to operate in an reduced operational state, in which the farming machine resolves the operational failure of the component by adjusting the farming operations performed by the farming machine.

BRIEF DESCRIPTION OF DRAWINGS

FIG. 7A-B illustrate a table of operational failures and respective solution operations, in accordance with one example embodiment.

Figure 1A:
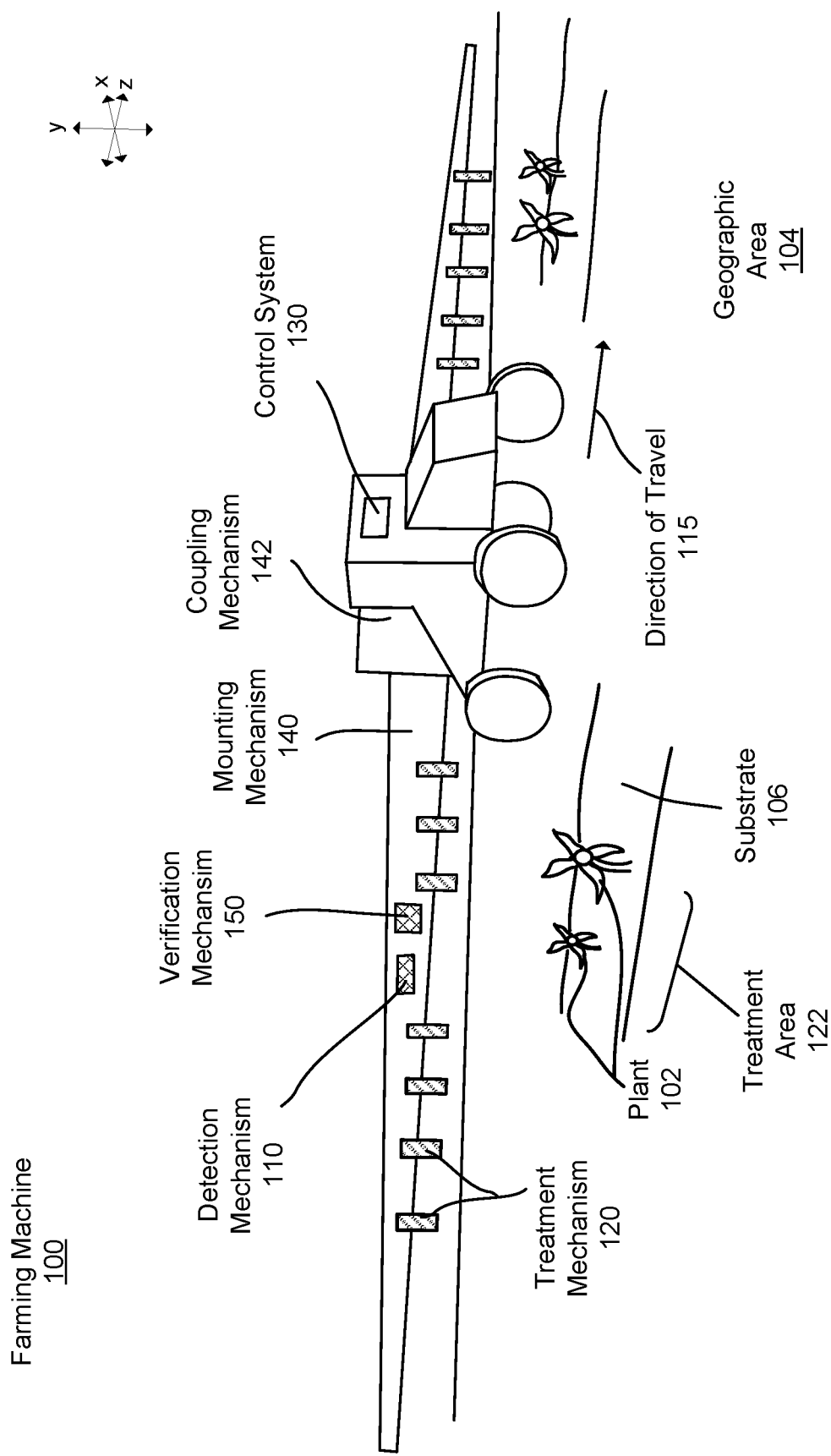
FIG. 1A illustrates an isometric view of a farming machine, in accordance with an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A farming machine includes an autonomous, semi-autonomous, automated, or semi-automated system for identifying and treating plants in a field. A semi-autonomous system may be a system where a subset of operations are performed autonomously, while another subset of operations are performed in conjunction with a user Similarly, a semi-automated system may be a system where a subset of operations are performed automatically, while another subset of operations are performed with a user. Techniques are described herein with reference to one type of system may equally apply to other types of systems, depending upon the embodiment. The farming machine employs an image acquisition system to detect plants for treatment as the farming machine travels through the field. The image acquisition system includes one or more image sensors (e.g., cameras) physically coupled to the farming machine to capture one or more images of one or more plants. A control system identifies a plant in the one or more images and actuates a treatment mechanism coupled to the farming machine to treat the identified plant. As such, the farming machine is configured to target and treat plants individually, thus reducing waste and preventing plant growth resulting from treatments that are applied liberally across a field. Using an automated system also reduces manual labor and other costs associated with treating plants individually, improving farming efficiency.

Automatically treating plants by employing a farming machines including a control system and numerous components is a complex process. There are many possible points of failure where the farming machine may cease to function normally. If a technician is needed to repair the farming machine in the field, significant time and resources can be wasted, even if the repair is minor or could be worked around. As described herein, the control system of a farming machine can diagnose and compensate for failures of the farming machine, often without human intervention, to enable the farming machine to continue performing its scheduled tasks. Depending upon the failure identified by the control system, the control system may pass through a series of techniques to address the failure, escalating from potential fixes, to workarounds, to determining the failure is unsalvageable and operation cannot continue, at which point the farming machine may elect to return to its home base.

Although various components, respective operational failures, and respective solution operations are described herein and in the table of FIG. 7, these should not be held as limiting. The techniques described herein apply to any components, respective operational failures, and respective solution operations of a farming machine, in many different configurations, such as an autonomous or semi-autonomous farming machines.

To illustrate, depending upon the embodiment, the farming machine may be one of any number of farming machines. For example, the farming machine may be a planter, a tractor, a boom sprayer, a harvester, or a tiller. Some or all of the techniques described herein apply to some or all of the various possible farming machines that operate within a field.

II. Plant Treatment System

Figure 1B:
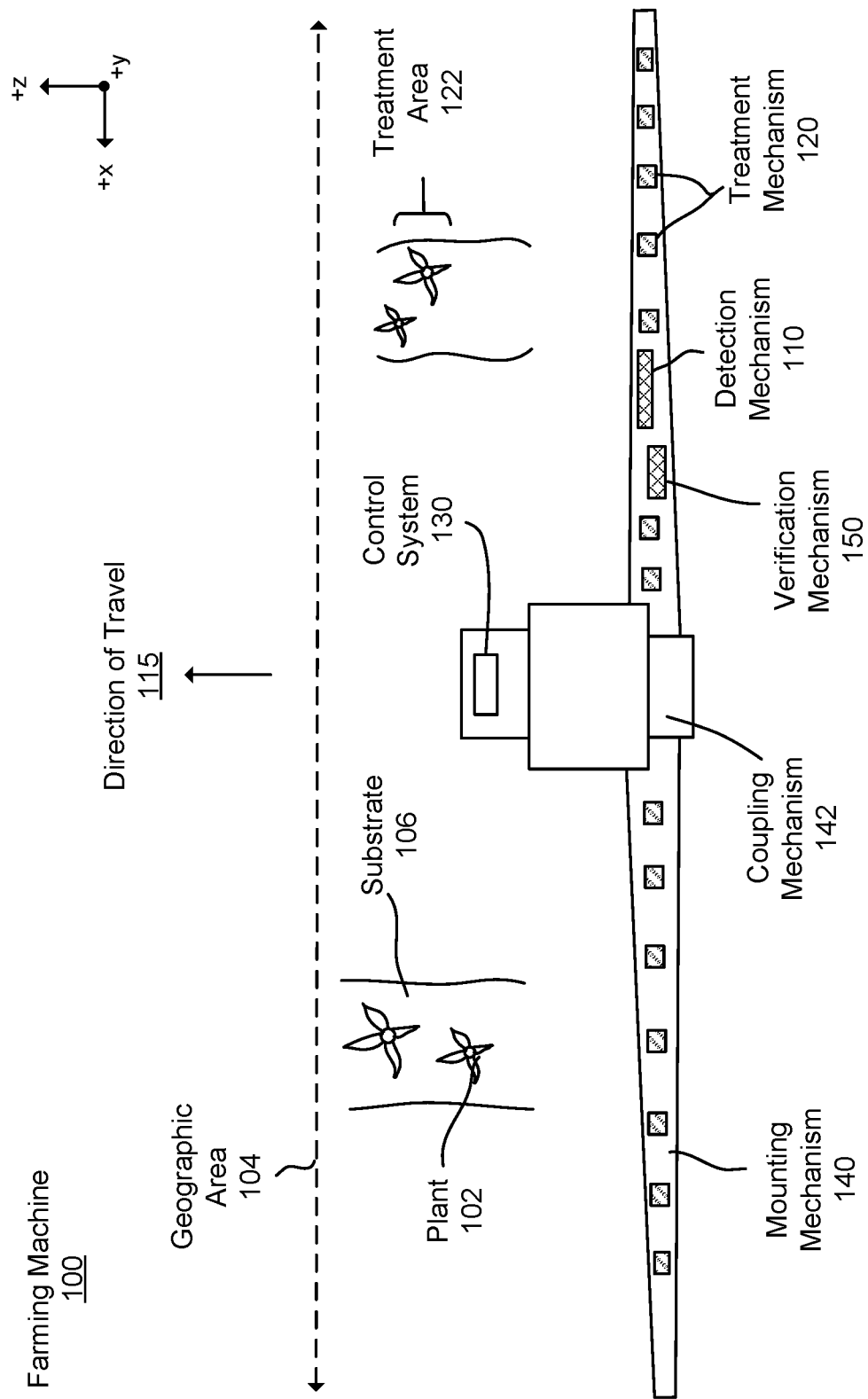
FIG. 1B illustrates a top view of a farming machine, in accordance with the example embodiment.
Figure 1C:
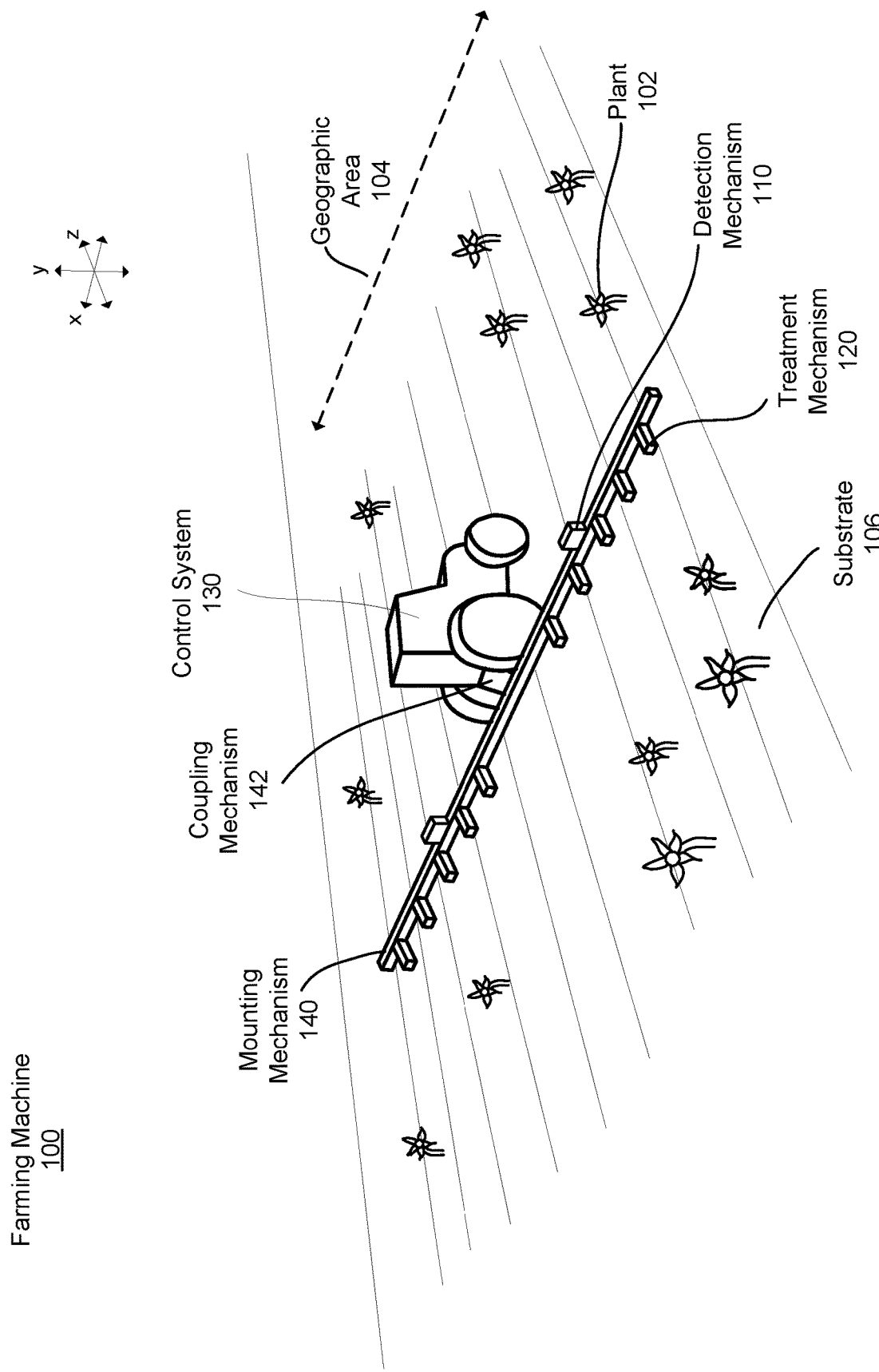
FIG. 1C illustrates an isometric view of a farming machine, in accordance with a second example embodiment.

A farming machine that identifies and treats plants may have a variety of configurations, some of which are described in greater detail below. For example, FIG. 1A is an isometric view of a farming machine and FIG. 1B is a top view of the farming machine of FIG. 1A. FIG. 1C is a second example embodiment of a farming machine. Other embodiments of a farming machine are also possible. The farming machine 100, illustrated in FIGS. 1A-1C, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102, but can alternatively be directly applied to multiple plants, indirectly applied to one or more plants, applied to the environment associated with the plant, or otherwise applied to plants. Environments associated with the plant can include soil, atmosphere, or other suitable portion of the plant environment adjacent to or connected by an environmental factor, such as, for example, wind or moisture on the ground connect two plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant (e.g., using a laser), applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

The plants 102 can be crops but can alternatively be weeds or any other suitable plant. The crop may be cotton, but can alternatively be lettuce, soybeans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), one or both of which are to be treated. Each plant 102 can include a stem, arranged superior (e.g., above) the substrate 106, which supports the branches, leaves, and fruits of the plant. Each plant can additionally include a root system joined to the stem, located inferior to the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, a CMOS camera, hyperspectral imaging system, LIDAR system (light detection and ranging system), a depth sensing system (e.g., using ultrasonic, radar, or single-point laser systems), dynamometer, IR camera, thermal camera, humidity sensor, light sensor, temperature sensor, or any other suitable sensor or combination of sensors. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves through the geographic location. However, in some embodiments, the detection mechanism 110 traverses over a geographic location at substantially the same time as the treatment mechanism 120, or it may even traverse over the geographic location after the treatment mechanism. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, water, a pesticide, some combination of the aforementioned, or some other spray treatment. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, the farming machine 100 includes a single treatment mechanism, wherein the treatment mechanism 120 is actuated or the farming machine 100 moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation, such as shown in FIGS. 1A-1C, the farming machine 100 includes an array of treatment mechanisms 120, wherein the treatment mechanisms 120 are actuated or the farming machine 100 is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 6. The control system 130 can apply one or more models to identify one or more plants in the field. The control system 130 may be coupled to the farming machine 100 such that a user (e.g., a driver) can interact with the control system 130. In other embodiments, the control system 130 is physically removed from the farming machine 100 and communicates with system components (e.g., detection mechanism 110, treatment mechanism 120, etc.) wirelessly. In some embodiments, the control system 130 is an umbrella term that includes multiple networked systems distributed across different locations (e.g., a system on the farming machine 100 and a system at a remote location). In some embodiments, one or more processes are performed by another control system. For example, the control system 130 receives plant treatment instructions from another control system.

In some configurations, the farming machine 100 includes a mounting mechanism 140 that functions to provide a mounting point for the system components. In one example, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame but can alternatively be any other suitable mounting mechanism. In the embodiment of FIGS. 1A-1C, the mounting mechanism 140 extends outward from a body of the farming machine 100 in the positive and negative x-direction (in the illustrated orientation of FIGS. 1A-1C) such that the mounting mechanism 140 is approximately perpendicular to the direction of travel 115. The mounting mechanism 140 in FIGS. 1A-1C includes an array of treatment mechanisms 120 positioned laterally along the mounting mechanism 140. In alternate configurations, there may be no mounting mechanism 140, the mounting mechanism 140 may be alternatively positioned, the mounting mechanism may be moveable, rotatable, or translatable, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In some embodiments, each wheel in each set is arranged along an opposing side of the mounting mechanism 140 such that the rotational axes of the wheels are approximately perpendicular to the mounting mechanism 140. In FIGS. 1A-1C, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally includes a verification mechanism 150 that functions to record a measurement of the ambient environment of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) to the detection mechanism 110 or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Figure 2:
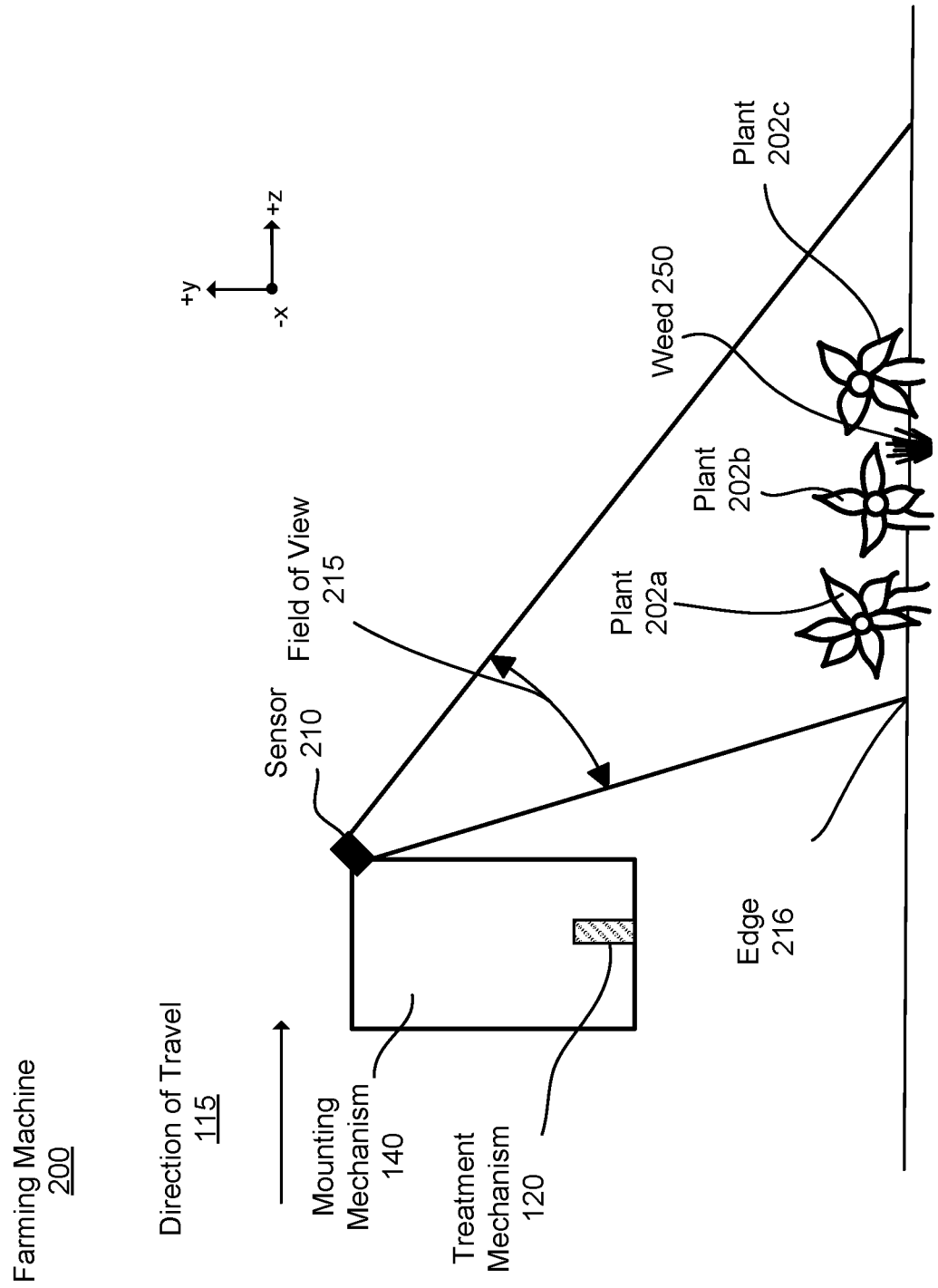
FIG. 2 illustrates a cross-sectional view of a farming machine including a sensor configured to capture an image of one or more plants, in accordance with a first example embodiment.

FIG. 2 illustrates a cross-sectional view of a farming machine including a sensor configured to capture an image of one or more plants, in accordance with some example embodiments. The farming machine 200 may be similar to any of the farming machines described in regard to FIG. 1A-1C (e.g., farming machine 100). In the embodiment of FIG. 2, the farming machine includes a sensor 210. Here, the sensor 210 is a camera (e.g., RGB camera, near infrared camera, ultraviolet camera, or multi-spectral camera), but could be another type of image sensor suitable for capturing an image of plants in a field. The farming machine 200 can include additional sensors mounted along the mounting mechanism 140. The additional sensors may be the same type of sensor as sensor 210 or different types of sensors.

In FIG. 2, sensor 210 has a field of view 215. The field of view 215, herein, is the angular extent of an area captured by a sensor 210. Thus, the area captured by the sensor 210 (e.g., the field of view 215) may be affected by properties (i.e., parameters) of the sensor 210. For example, the field of view 215 may be based on, for example, the size of the lens and the focal length of the lens. Additionally, the field of view 215 may depend on an orientation of the sensor. For example, an image sensor with a tilted orientation may generate an image representing a trapezoidal area of the field, while an image sensor with a downwards orientation may generate an image representing a rectangular area of the field. Other orientations are also possible.

In FIG. 2, the sensor 210 is tilted. More specifically, the sensor 210 is mounted to a forward region of the mounting mechanism 140, and the sensor 210 is tilted downwards towards the plants. Described herein, a downwards tilt angle is defined as an angle between the z-axis and the negative y-axis. The field of view 215 includes plants 202a, 202b, 202c and weed 250. The distance between the sensor 210 and each plant varies based on the location of the plant and the height of the plant. For example, plant 202c is farther than plant 202a from the sensor 210. The sensor 210 can be tilted in other directions.

FIG. 2 also illustrates a treatment mechanism 120 of the farming machine. Here, the treatment mechanism 120 is located behind the sensor 210 along the z-axis, but it could be in other locations. Whatever the orientation, the sensor 210 is positioned such that the treatment mechanism 120 traverses over a plant after the plant passes through the field of view 215. More specifically, as the farming machine 100 travels towards the plant 202, the plant 202 will exit the field of view 205 at an edge 216 of the field of view nearest the treatment mechanism 120. The distance between the edge 216 and the treatment mechanism 120 is the lag distance. The lag distance allows the control system 130 to capture and process an image of a plant before the treatment mechanism 120 passes over the plant. The lag distance also corresponds to a lag time. The lag time is an amount of time the farming machine has before the treatment mechanism 120 passes over the plant 202. The lag time is an amount of time calculated from farming machine operating conditions (e.g., speed) and the lag distance. Accordingly, treatments for plants 202 passing through the field of view 215 must be determined by the control system 130 in less than the lag time.

In some configurations, the treatment mechanism 120 is located approximately in line with the image sensor 210 along an axis parallel to the y-axis but may be offset from that axis (i.e., the image sensor 210 is approximately on top of the treatment mechanism 120). In some configurations, the treatment mechanism 120 is configured to move along the mounting mechanism 140 in order to treat an identified plant. For example, the treatment mechanism may move up and down along a y-axis to treat a plant, or left and right along the x-axis to treat a plant. Additionally, the treatment mechanism 120 can be angled towards or away from the plants. Other similar examples are possible.

In various configurations, a sensor 210 may have any suitable orientation for capturing an image of a plant. Further, a sensor 210 may be positioned at any suitable location along the mounting mechanism 140 such that it can capture images of a plant as a farming machine travels through the field.

III. Failures

Any component of the farming machine 100 can degrade over time, particularly with use. For example, a component of a detection mechanism 110 or treatment mechanism 120 may degrade such that it has an operational failure that prevents normal operation. As a specific example, a nozzle of a treatment mechanism 120 may be clogged, or a lens of a detection mechanism 110 may be dirty. In an embodiment, an operational failure can be a component reaching the expiration of its functional life, rather than, or in addition to, actually breaking or reducing functionality. Different farming machines 100 may encounter different operational failures. For example, a tiller may encounter warped or broken shanks, a container (e.g., a fuel tank or battery, or a tank containing a chemical agent) may be too low, or a seeder may have a clogged seed line. Various components that can fail on a farming machine are listed in the table of FIG. 7 under the column "Component," which is not exhaustive; techniques described herein can be applied to components not listed in the table of FIG. 7.

IV. Detection of Failures

The control system 130 of the farming machine 100 evaluates data from one or more sensors of the farming machine 100, such as the detection mechanism 110, to monitor one or more components of the farming machine 100 for an operational failure. An operational failure to a component of a farming machine is a deviation from normal or expected operation of the component. This deviation may be due to a physical issue with the component, such as a deforming of the component, a clogging of a pipe, a loose wire, or so on; an environmental issue, such as wheels stuck in a puddle, a camera covered in mud, or a tree branch stuck in a boom; or a software issue, such as a poor network connection or a bug in software of the farming machine.

Different components of the farming machine 100 may be monitored for operational failures. The farming machine monitors those components using different sensors of the farming machine 100. To provide a few contextual examples, a clogged nozzle may be diagnosed using a camera and/or pressure sensor, while a leak in a tank containing a chemical agent may be diagnosed using a weight scale, and a broken detection mechanism 110 may be diagnosed by the control system 130 by more than a threshold time passing since most recent data was received from the detection mechanism 110.

As a specific example, one or more wheels of the farming machine 100 may not operate properly (e.g., cannot traverse terrain in the field), and thus the farming machine identifies an operational failure of a wheel. The farming machine may identify the operational failure by identifying a puddle or other hazard, e.g., using one or more sensors. In an embodiment, the farming machine determines a wetness of the soil, which may involve evaluation of terrain and/or weather models, and/or a measurement of torque needed to move soil, in various embodiments. In an embodiment, the farming machine determines that it is moving too fast, and therefore identifies moving too fast as an operational failure of the wheels. The farming machine may determine that it is moving too fast if it cannot identify plants in the field, if it determines (e.g., based on sensor data) that there is more than a threshold amount of dust in the air proximate to the farming machine, if it determines that a boom is too high from the ground, and/or if weeds in the field are of at least a particular size (e.g., by height).

Example sensors that can identify operation failures are listed in the "Diagnosis" column of the table of FIG. 7, but that list is not intended to be exhaustive. That is, techniques described herein for identifying operational failures of one or more components on a farming machine can involve sensors not listed in the table of FIG. 7.

V. Autonomous Compensatory Actions

Typically, the farming machine operates in a normal operational state when performing farming operations. The farming machine is in the normal operational state when it is performing farming operations without detection of any operational failures. For example, performing farming operations in a field as it traverses through the field (e.g., spraying, harvesting, necrosing weeds, etc.). In an embodiment, making a maneuver to traverse through the field is a farming operation. In the normal operational state, the farming machine proceeds with sequentially performing one or more scheduled farming operations. For example, sequentially spraying weeds that lie in a plant bed as it travels through the plant bed. In some embodiments, some farming actions may be at least partially performed in parallel. For example, controlling the various parameters of combine harvester as it harvest plants in a plant bed. In either normal operational state, the farming machine 100 evaluates data from one or more sensors to monitor for operational failures. A scheduled set of farming operations for the farming machine may cumulatively accomplish a farming objective. A farming objective is a general farming goal, such as growing crops, or necrosing non-crops in the field.

The farming machine 100 enters a remedial operational state upon detection of a problem with a component of the farming machine. The remedial operational state is a diagnostic state in which the farming machine 100 identifies the operational failure and initiates one or more solution operations to address the operational failure. Performing a solution operation may include entering an additional operational state that is not the normal operational state or remedial operational state, as further described below and with reference to FIG. 3. In the remedial operational state, the farming machine 100 may cease to perform one or more farming operations, and/or cease movement, depending upon the embodiment.

Solution operations corresponding to the various states are given in the table of FIG. 7. More specifically, solution operations for a recovery operational state, a redundancy operational state, and an reduced operational state are listed in the table of FIG. 7, in the "Recovery," the "Redundancy," and the "Reduced" columns, respectively. The farming machine 100 may attempt one or more solution operations, from one or more operational states, depending upon the embodiment. The table of FIG. 7 is not exhaustive, and various other solution operations may be employed without departing from the techniques described herein.

To illustrate, consider a particular example of autonomous compensatory action wherein a farming machine 100 is spraying a chemical agent (e.g., fertilizer, or an herbicide) upon particular plants within a field (e.g., crops, or weeds). As described above, the farming machine 100 uses detection mechanisms 110 to identify crops and discriminate them from other portions of the field, such as dirt or weeds. The farming machine 100 may drive through mud, flinging the mud off the tires and onto portions of the farming machine 100, resulting in occlusion of a lens of a particular detection mechanism 110. As such, the farming machine 100 cannot use the detection mechanism 110 to discriminate crops from other portions of the field. The control system 130 receives image data from the detection mechanism 110 and detects that the image data cannot be used to identify the crops in the field. As such, the farming machine 100 enters a remedial operational state. In the remedial operational state, the farming machine 100 matches the operational failure to one or more solution operations in an index of operational failures and their respective solution operations.

The farming machine 100 attempts one or more solution operations to address the operational failure. For example, the farming machine may adjust a nozzle to spray the lens to clear it of mud. Alternatively, the farming machine may use image data from one or more detection mechanisms 110 adjacent to the particular detection mechanism 110 with overlapping fields of view to identify the crops. Alternatively, the farming machine may adjust a nozzle corresponding to the particular detection mechanism 110 to spray the entire region within the detection mechanism's 110 field of view. Alternatively, the farming machine may not spray using the nozzle corresponding to the particular detection mechanism 110 during a first pass over the field. Then, the farming machine 100 makes a second pass through the field such that regions of the field that were within the particular detection mechanism's 110 field of view are instead within the field of view of a fully operational detection mechanism 110, enabling treatment of those regions of the field.

The farming machine 100 may attempt one or more of these solution operations until the operational failure is addressed and farming operation can continue. For example, the farming machine 100 may perform the solution operations in a preset order. If no solution operation worked, the farming machine 100 may send a notification to a remote device, such as a user's computer, that the farming machine needs repairs, and/or the farming machine 100 may return to a designated location outside the field, such as a home base, charging station, or the like. As a second example, the farming machine 100 may detect, using a pressure sensor on a nozzle, that the nozzle is clogged. The farming machine 100 enters a remedial operational state and matches the operational failure to a solution operation involving raising pressure within the nozzle. The farming machine 100 increases pressure within the nozzle, which clears the blockage. The farming machine 100 monitors data from the pressure sensor and detects the clearing of the clog. As such, the farming machine 100 returns to the normal operational state and resumes the farming operations normally.

Additionally, performing solution operations can include entering an additional operational state. Additional operational states are operational states in which the farming machine 100 is configured to perform alternative operations outside the scheduled farming operations performed by the farming machine 100 in the normal operational state. Various additional operational states may be a recovery operational state, a redundancy operational state, an reduced operational state, or an unsalvageable operational state, depending upon the embodiment.

A recovery operational state is an additional operational state of the farming machine 100 in which the farming machine 100 attempts to correct the operational failure to return to the normal operational state (e.g., where expected measurements of the failed component return to be within a normal range). For example, the farming machine 100 may move backwards to pull a towed implement out of a bush while in a recovery operational state.

A redundancy operational state is an additional operational state of the farming machine 100 in which the farming machine 100 attempts to perform a farming operation that employs the failed component using other components of the farming machine. For example, if an image sensor on a boom is broken, the farming machine 100 may use an adjacent image sensor to acquire image data for a region usually measured by the broken image sensor, thereby allowing the farming machine 100 to discriminate crops from the rest of the field.

An reduced operational state is an additional operational state of the farming machine 100 in which the farming machine 100 attempts to perform a different farming operation than is scheduled for performance. For example, the farming machine 100 may be scheduled to first treat crops with pesticide on a first pass through the field, then treat weeds with herbicide on a second pass through the field. If a tank containing pesticide has a leak, the farming machine 100 may proceed to the second scheduled farming operation and begin traversing the field to apply herbicide to weeds.

An unsalvageable operational state is an additional operational state of the farming machine 100 in which the farming machine 100 cannot proceed with one or more farming operations (e.g., a currently scheduled farming operation, in an embodiment where the farming machine is not configured to include an reduced operational state). For example, the farming machine 100 may be scheduled to treat crops with fertilizer, but all tanks of fertilizer are empty. As such, the farming machine 100 may return to a designated location outside the field, such as a loading bay.

VI. Addressing Operational Failures

Figure 3:
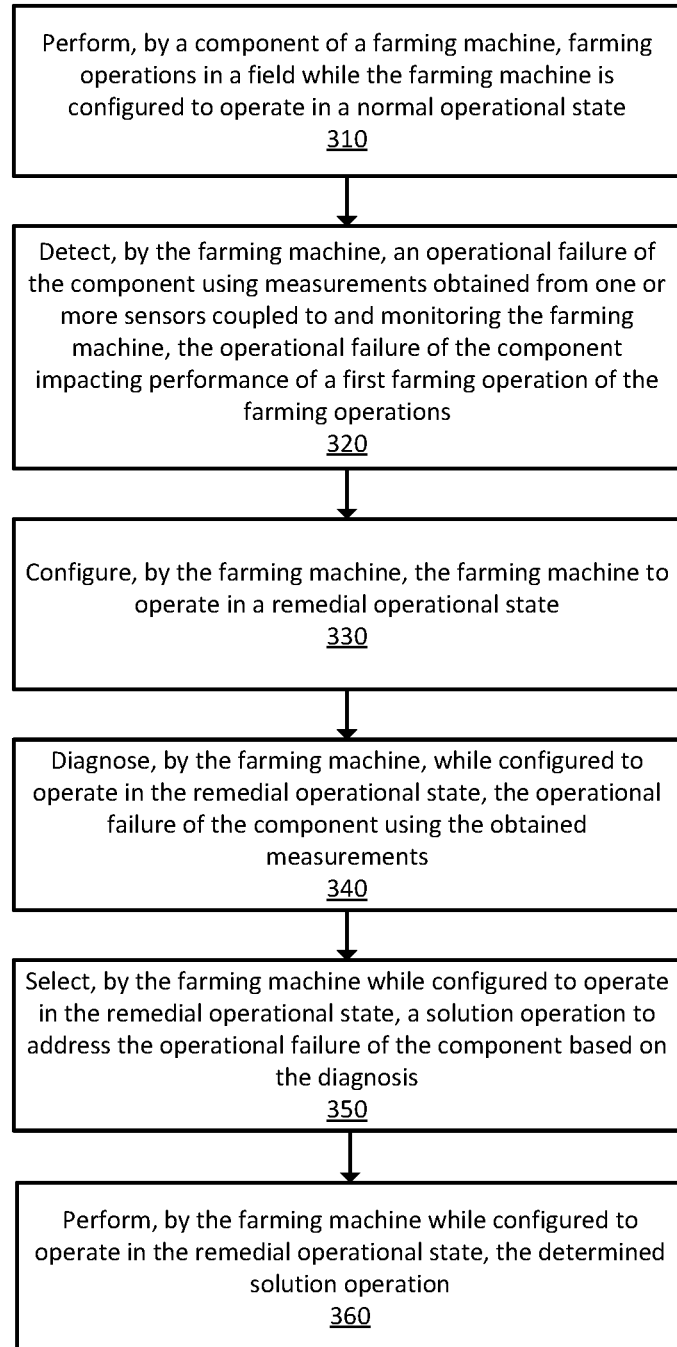
FIG. 3 is a flow chart illustrating a method of a farming machine to autonomously address an operational failure to a component of the farming machine, in accordance with one example embodiment.

FIG. 3 is a flow chart illustrating a method 300 of a farming machine 100 to autonomously address an operational failure to a component of the farming machine 100, in accordance with one embodiment.

A component of a farming machine 100 performs 310 farming operations in a field while the farming machine is configured to operate in a normal operational state. Typically, the farming machine 100 is performing a set of farming actions in sequence as it moves through the field. Various components of the farming machine 100 may perform various farming operations simultaneously and/or sequentially.

The farming machine 100 detects 320 an operational failure of a component of the farming machine 100. Again, an operational failure of the component occurs when the component failure impacts, for example, performance of a first farming operation of the set of farming operations. To determine whether there is a component failure, the control system 130 of the farming machine 100 evaluates the measurements associated with and including that component. A measurement used to evaluate a component of a farming machine is a sensor output checked by the farming machine 100 against expected output to verify whether the component of operating normally or within expected bounds of output. For example, the measurement may be an amount of pressure, a speed, or so on, or may be an output from a machine learning model, e.g., semantic label and/or associated probability output by a computer vision component of the farming machine 100. In an embodiment, the expected output can be updated, by the farming machine 100, a remote computing device, or a human administrator. For example, the farming machine 100 or a remote computing device may determine that a particular sensor threshold correlates with the operational failure of a respective component (which may be the sensor itself). As such, the farming machine updates the expected output based on the particular sensor threshold.

In alternative embodiments, the farming machine 100 detects 320 the operational failure using one or more other techniques in addition to, or alternatively from, the evaluation of measurements from sensors. In one embodiment, the operational failure is detected 320 at least in part by another farming machine 100 in a fleet of farming machines 100 operating in the field. In one embodiment, the operational failure is detected 320 at least in part by a human observer. In one embodiment, the operational failure is detected 320 at least in part by root-cause analysis of another farming machine 100 (e.g., analysis of components related to a respective operational failure).

Each type of component and its associated measurements may have bounds defining normal operation. When measurements exceed the defined bound of normal operation are identified by the control system 130, the control system then determines that component is having an operational failure. Additionally, as described above, an image recognition system may also be employed to identify an operational failure. In this case, images are similar to the measurements described above. That is, the control system 130 can employ machine vision algorithms to determine if information in the image indicates that one or more of the imaged components is undergoing an operational failure.

The farming machine 100 configures 330 the farming machine to operate in a remedial operational state when the control system detects an operational failure. The farming machine 100, while configured to operate in the remedial operational state, diagnoses 340 the operational failure of the component using the obtained measurements. The farming machine 100 may compare the identified operational failure to an index of operational failures and respective solution operations. For example, a first identified operational failure may be one of three potential operational failures of the component, and the farming machine 100 matches the first identified operational failure to one of the three potential operational failures. The farming machine 100 then checks the index for one or more respective solution operations associated with the first identified operational failure. As a particular example, a tube on the farming machine may be decoupled from an aperture on a tank, twisted shut upon itself, or ripped open along a side. The farming machine may determine to close the aperture in the first case, or to manipulate another component of the farming machine to untwist the tube in the second case. Other examples are also possible.

For each operational failure, the respective solution operations may be structured in a preset sequence of solution operations, attempted in order by the farming machine 100 until the operational failure is resolved. The farming machine 100 may cease to travel through the field and/or cease performance of farming operations while in the remedial operational state.

Depending upon the one or more solution operations identified for an operational failure, the farming machine 100 may enter an additional operational state to perform the solution operation. The farming machine 100 is configured to perform solution operations in a variety of manners. For example, performing the solution operation may involve configuring the farming machine to operate in a recovery operational state to resolve the operational failure of the component by, for example, fixing or replacing the component. Performing the solution operation may involve configuring the farming machine to operate in a redundancy operational state to resolve the operational failure of the component by employing other components of the farming machine to perform the first farming operation. Performing the solution operation may involve configuring the farming machine to operate in an reduced operational state to resolve the operational failure of the component by adjusting the farming operations performed by the farming machine.

The farming machine 100, while configured to operate in the remedial operational state, selects 350 a solution operation to address the operational failure of the component based on the diagnosis. The selected solution operation may be an initial solution operation of a sequence of solution operations, if the operational failure is associated with such a sequence of solution operations. The farming machine 100, while configured to operate in the remedial operational state, performs 360 the determined solution operation.

In an embodiment, if the one or more solution operations for an operational failure fail to resolve the operational failure, the farming machine 100 returns to a designated location outside the field. If the farming machine 100 resolves the operational failure using a solution operation, the farming machine 100 verifies the solution by attempting to perform the farming operation. Upon successfully performing the farming operation, the farming machine 100 configures itself to enter the normal operational state.

VII. Verifying Farming Machine Configuration

Figure 4:
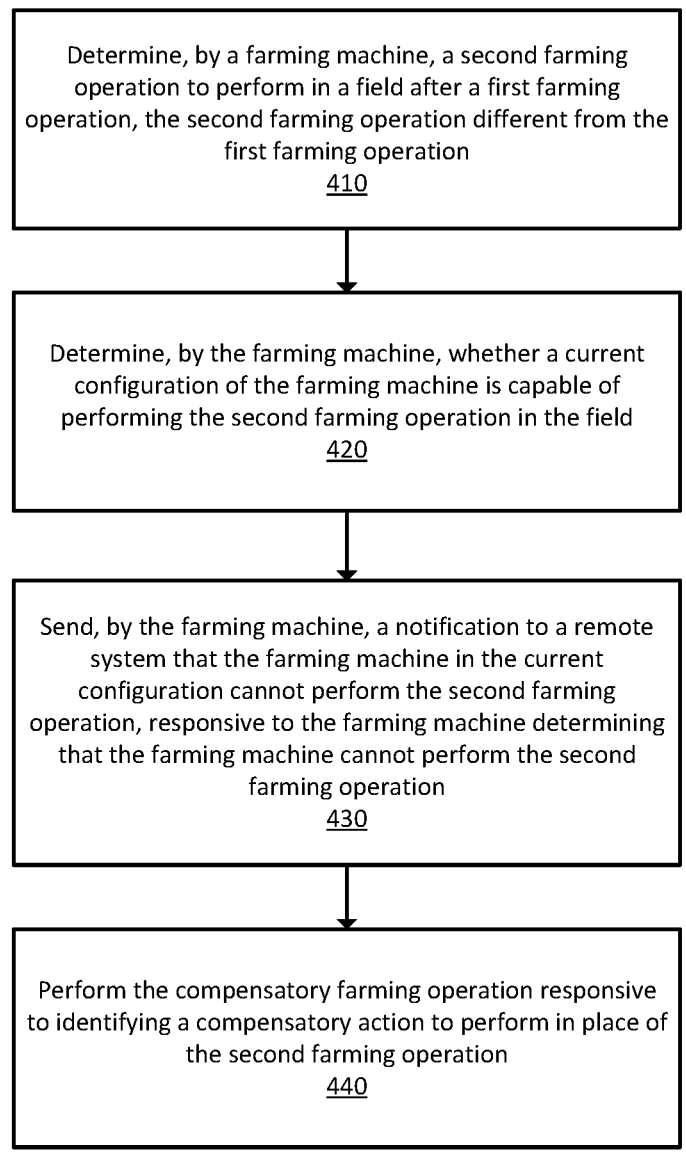
FIG. 4 is a flow chart illustrating a method of a farming machine to autonomously verify a configuration of the farming machine, in accordance with one example embodiment.

FIG. 4 is a flow chart illustrating a method 400 of a farming machine 100 to autonomously verify a configuration of the farming machine 100, in accordance with one embodiment.

The farming machine is travelling through a field performing a set of farming operations. For example, the farming machine is identifying and treating plants with various spray treatments. While doing so, the farming machine 100 is in a current state where its components and configuration (i.e., the first configuration) are appropriate for performing a first farming operation of the set of farming operations in the field.

The farming machine determines 410 a second farming operation to perform in the field after it performs the first farming operation, and the second farming operation is different from the first farming operation. For example, the farming machine may first spray fertilizer upon crops in the field, then spray herbicide upon weeds in that same field. The subsequent spray may be on the same or different passes. In an embodiment, the farming machine determines the second farming operation by referencing the sequenced set of farming operations to be performed in the field. In an embodiment, determining, by the farming machine, the second farming operation to perform in the field after the first farming operation includes determining a treatment for the field. Determining the treatment for the field can include analyzing measurements obtained from one or more sensors coupled to the farming machine. In an embodiment, determining, by the farming machine, the second farming operation to perform in the field after the first farming operation includes accessing a treatment plan comprising a plurality of farming operations for the farming machine to perform.

The farming machine determines 420 whether the current configuration (i.e., that used to implement the first farming action) of the farming machine is capable of performing the second farming operation in the field. To do so, the farming machine compares the first set of components in the first configuration to the second set of components in the second configuration to determine whether one or more components needed for the second farming operation are installed on the farming machine. Based on this comparison, the farming machine may determine it is not possible to appropriately configure the farming machine. That is, if a component necessary to perform the second farming operation is missing from the farming machine, or if the farming machine cannot be appropriately configured, it cannot perform the second farming operation.

To expand, in an embodiment, in determining whether the current configuration is capable of performing the second farming action in the field, the farming machine can 100 identify the components and configuration necessary for the farming machine to perform each of the first farming operation and the second farming operation in the field. Each farming operation is associated with a necessary components and configuration list stored on the control system of the farming machine. For example, the farming machine may require a first set of components in a first configuration top perform the first farming operation, while it may require a second set of components in a second configuration to perform the second farming operation. There may or may not be overlap between the first set of components and the second set of components and/or the first configuration and the second configuration. Thus, the farming machine can determine whether the farming machine is capable of performing the second farming operation by comparing relative components and configurations.

In an embodiment, in determining whether the farming machine can perform the second farming operation, the farming machine checks a condition of each component needed for the second farming operation. If one or more of the needed components have an operational failure, the farming machine is not capable of performing the second farming operation. Depending upon the embodiment, the farming machine may perform this step in the field, or upon receiving the set of farming operations, e.g., at a home base or charging station.

The farming machine sends 430 a notification to a remote system that the farming machine in the current configuration cannot perform the second farming operation, responsive to the farming machine determining that the farming machine cannot perform the second farming operation. For example, the farming machine may send 430 the notification to a device of a user that sent the set of farming operations to the farming machine. The notification may include configurations of the farming machine at issue, e.g., indications of the components on the farming machine, that are needed, and/or that have an operational failure.

The farming machine 100 identifies and performs 440 a compensatory farming operation in place of the second farming operation. The farming machine may do so responsive to a passage of at least a threshold amount of time after sending the notification to the remote system without receiving corresponding instructions from the remote system.

There are many types of compensatory farming operations that may be implemented by the farming machine in lieu of the second farming operation. In a first example, the compensatory farming operation is a next farming operation in the set of farming operations. In a second example, the compensatory farming operation is returning to a designated location, modifying the farming machine to include the component needed for the second farming operation, and then performing the second farming operation as the compensatory farming operation. In a third example, the farming machine may cease farming operations until a response is received from the remote system. In a fourth example, the farming machine receives additional instructions from a remote system to initiate a third farming operation in the field. The farming machine verifies it is capable of performing the third farming operation, e.g., by checking a respective component list against the components installed on the farming machine. The farming machine performs the third farming operation as the compensatory farming operation. In a fifth example, the farming machine adjusts one or more components of the farming machine to enable the second farming operation, then perform the second farming operation as the compensatory farming operation. In a sixth example, the farming machine determines the second farming operation by analyzing measurements obtained from one or more sensors coupled to the farming machine. For example, the farming machine may analyze image data to identify a particular plant species in the field and select a respective preset farming operation for the particular plant species. The aforementioned compensatory farming actions are just examples, and other compensatory farming actions are also possible.

VIII. Autonomous Salvaging of a Farming Machine

Figure 5:
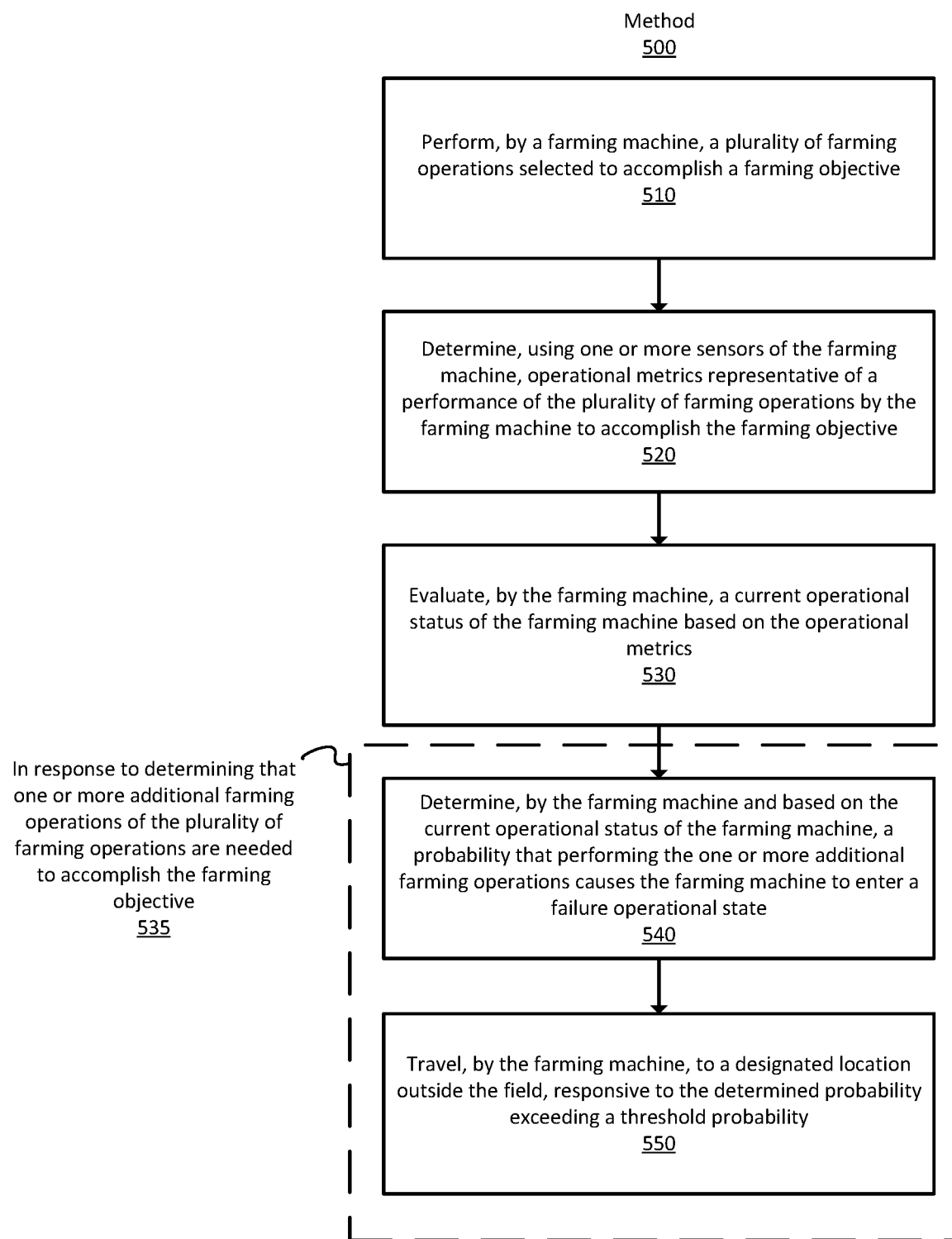
FIG. 5 is a flow chart illustrating a method of a farming machine to autonomously salvage the farming machine, in accordance with one example embodiment.

FIG. 5 is a flow chart illustrating a method 500 of a farming machine to autonomously salvage the farming machine, in accordance with one embodiment.

The farming machine performs 510 a plurality of farming operations selected to accomplish a farming objective. The farming machine determines 520, using one or more sensors of the farming machine to generate measurements representative of a performance of the plurality of farming operations by the farming machine to accomplish the farming objective. The farming machine evaluates 530 a current operational status of the farming machine based on the measurements. This may be responsive to detecting an operational failure of a component of the farming machine. Determining the measurements may include determining a weather condition in an environment surrounding the farming machine using one or more sensors of the farming machine, such as a thermometer. Determining the measurements may also or alternatively include determining a state of soil in the field, using one or more sensors of the farming machine. Determining the measurements may additionally or alternatively include determining a fuel level of the farming machine. The state of soil in the field may include a composition of the soil, the presence of one or more particular nutrients in one or more particular quantities in the soil, the presence of water in the soil (e.g., beyond a threshold amount), the presence of one or more residues or materials, a temperature, or so on. In response to determining 535 that one or more additional farming operations of the plurality of farming operations are needed to accomplish the farming objective, the farming machine performs the determination 540 and travel 550 steps below.

The farming machine determines 540, based on the current measurements of the sensors of the farming machine, a probability that performing the one or more additional farming operations causes the farming machine to enter a failure operational state. The determined probability may be based on a weather condition, a state of soil in the field, and/or a fuel level of the farming machine, etc. depending upon the embodiment. In an embodiment, the farming machine identifies one or more operational failures to one or more components of the farming machine and determines the probability based on the one or more operational failures. For example, the farming machine may identify that a spray nozzle in an array has an operational failure and determines that the probability that the nozzle failure will cause the farming machine to enter the failure operational state. In an embodiment, the farming machine determines a present quantity of a farming material, such as a spray agent, seeds, or so on, present on the farming machine and determines the probability based on the present quantity.

In an embodiment, the probability is based on a fatigue score of a component of the farming machine. The fatigue score is a score determined by the farming machine and indicating a level of fatigue and/or wear of the respective component. The fatigue score may be based on analysis, by the control system, of image data of the component, and/or other measurements received from sensors upon the farming machine (e.g., measured decay in component performance, intermittent measurements, measurements indicating failure, etc.). The more fatigued and/or worn a component is, the more likely it is to cause an operational failure. In an embodiment, the fatigue score may additionally be determined by the farming machine for consumable components of the farming machine, such as fuel and/or electricity for the farming machine, one or more treatment substances (such as herbicide or pesticide), etc.

The farming machine travels 550 to a designated location outside the field, responsive to the determined probability of failure exceeding a threshold probability. The farming machine may send a notification to a remote system that the farming machine is returning to the designated location. For example, the remote system may be a user device of a user that administers the farming machine. In an embodiment, the farming machine enters a salvage operational state after determining the determined probability exceeds the threshold probability. The salvage operational state overrides the plurality of farming operations with an instruction to return to the designated location. In an embodiment, the farming machine sends a request to return to the designated location to the remote system and travels to the designated location responsive to receiving, from the remote system, instructions to travel to the designated location.

IX. Control System

Figure 6:
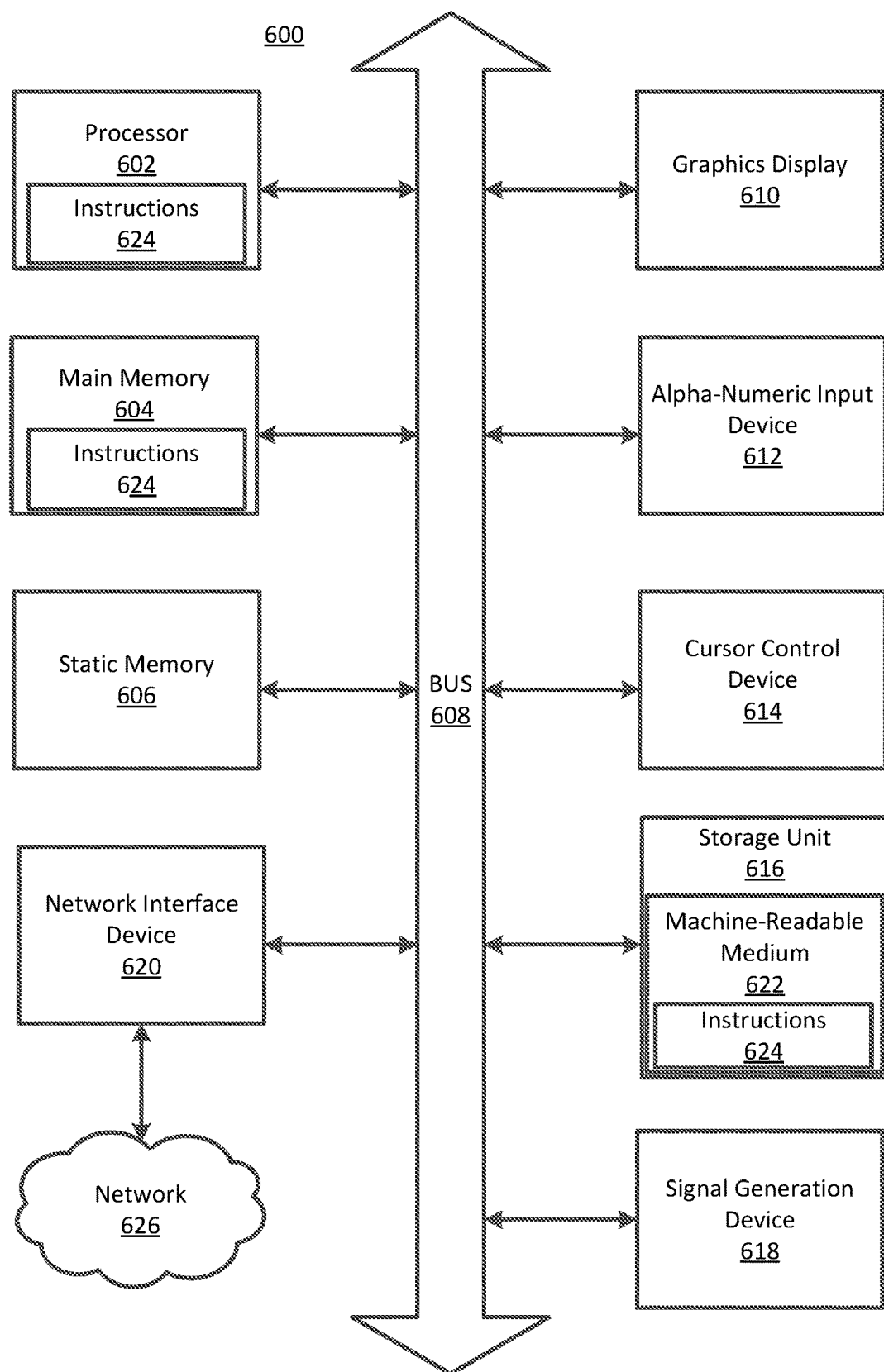
FIG. 6 is a block diagram illustrating components of an example machine for reading and executing instructions from a machine-readable medium.

FIG. 6 is a block diagram illustrating components of an example machine for reading and executing instructions from a machine-readable medium. Specifically, FIG. 6 shows a diagrammatic representation of control system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the system 130 described in FIG. 2. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

The control system 130 can comprise a processing unit (e.g., one or more of a CPU, a GPU, or an FPGA) and a data storage medium (e.g., static or dynamic memory). In one embodiment, the control system 130 comprises a deep-learning GPU that is configured to effectively execute a deep-learning neural network. For example, the computer system 600 may include an NVIDIA GeForce® GTX™ TITAN X using the Caffe deep learning framework or the NVIDIA Jetson Xavier using the TensorFlow deep learning framework. Furthermore, image data passed in to the computer instructions may be transmitted to the control system 130 for processing using any type of transmission protocol. For example, the open systems interconnect (OSI) model may be used to send image data from an image sensor 210 to the control system 130 using ethernet connections between these components.

X. Example Table of Operational Failures and Solution Operations

FIG. 7A-B illustrate a table 700 of operational failures and respective solution operations, in accordance with one example embodiment. For legibility, the table 700 is split across FIG. 7A and FIG. 7B after the column titled "Recovery" and before the column titled "Redundancy," respectively. Partial table 700A is adjacent to partial table 700B such that the columns of partial table 700A are to the left of the columns of partial table 700B, as indicated by table division symbol 710 in FIG. 7B and table division symbol 705 in FIG. 7A. Each row indicates a component of a farming machine 100 at the "Component" column, a potential operational failure of the component at the "Failure" column, a sensor used to diagnose the operational failure in the "Remedial State" column, a solution operation to attempt in a recovery operational state in the "Recovery" column, a solution operation to attempt in a redundancy operational state in the "Redundancy" column, a solution operation to attempt in a reduced operational state in the "Reduced" column, and a solution operation to attempt in an unsalvageable operational state in the "Unsalvageable" column. The components and respective operational failures and solution operations listed in the table 700 are non-exhaustive, and rather illustrate one embodiment.

XI. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a farming machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for a farming machine to autonomously address an operational failure of a component of the farming machine, the method comprising:
    performing, by the component of the farming machine, farming operations in a field while the farming machine is configured to operate in a normal operational state;
    detecting, by the farming machine, the operational failure of the component using measurements obtained from one or more sensors coupled to and monitoring the farming machine, the operational failure a mechanical failure of the component that impacts performance of a first farming operation of the farming operations;
    configuring, by the farming machine, the farming machine to operate in a remedial operational state;
    diagnosing, by the farming machine while configured to operate in the remedial operational state, the operational failure of the component using the obtained measurements;
    selecting, by the farming machine while configured to operate in the remedial operational state, a solution operation from a set of potential solution operations for mechanical failures of the component to address the operational failure of the component based on the diagnosis, and wherein the selected solution operation includes modifying, based on the selected solution and the mechanical failure of the component, at least some of the farming operations performed by the farming machine; and
    performing, by the farming machine while configured to operate in the remedial operational state, the selected solution operation.

2. The method of claim 1, wherein the selected solution operation comprises:
    performing, by the farming machine, a sequence of potential solution operations to the operational failure of the component in a preset order until the operational failure of the component is resolved.

3. The method of claim 2, further comprising:
    responsive to determining, by the farming machine, that the sequence of potential solution operations failed to resolve the operational failure of the component:
        returning, by the farming machine, to a designated location.

4. The method of claim 1, wherein configuring, by the farming machine, the farming machine to operate in a remedial operational state comprises:
    ceasing, by the farming machine, performance of the farming operations while configured to operate in the remedial operational state.

5. The method of claim 1, wherein configuring, by the farming machine, the farming machine to operate in a remedial operational state comprises:
    ceasing, by the farming machine, travel through the field while configured to operate in the remedial operational state.

6. The method of claim 1, wherein detecting, by the farming machine, the operational failure of the component using measurements obtained from one or more sensors coupled to and monitoring the farming machine, comprises:
    analyzing data received from a camera of the farming machine.

7. The method of claim 1, further comprising:
    verifying, by the farming machine, the selected solution operation resolved the operational failure of the component; and
    configuring, by the farming machine, the farming machine to operate in the normal operational state.

8. The method of claim 1, wherein determining the solution operation comprises referencing, by the farming machine, a data store that indexes operational failures and respective potential solution operations.

9. The method of claim 1, wherein performing the selected solution operation comprises:
    configuring, by the farming machine, the farming machine to operate in a recovery operational state to resolve the operational failure of the component by fixing the component.

10. The method of claim 1, wherein performing the selected solution operation comprises:
    configuring, by the farming machine, the farming machine to operate in a redundancy operational state to resolve the operational failure of the component by employing other components of the farming machine to perform the first farming operation.

11. The method of claim 1, wherein performing the selected solution operation comprises:
    configuring, by the farming machine, the farming machine to operate in a reduced operational state to resolve the operational failure of the component by adjusting the farming operations performed by the farming machine.

12. A system, comprising:
a computer processor; and
a non-transitory computer-readable storage medium storing computer program instructions executable by the computer processor to perform steps of a farming machine traveling in a field to autonomously address a particular operational failure of a component of the farming machine, the steps comprising:
  performing, by the component of the farming machine, farming operations in a field while the farming machine is configured to operate in a normal operational state;
  detecting, by the farming machine, the operational failure of the component using measurements obtained from one or more sensors coupled to and monitoring the farming machine, the operational failure a mechanical failure of the component that impacts performance of a first farming operation of the farming operations;
  configuring, by the farming machine, the farming machine to operate in a remedial operational state;
  diagnosing, by the farming machine while configured to operate in the remedial operational state, the operational failure of the component using the obtained measurements;
  selecting, by the farming machine while configured to operate in the remedial operational state, a solution operation from a set of potential solution operations for mechanical failures of the component to address the operational failure of the component based on the diagnosis, and wherein the selected solution operation includes modifying, based on the selected solution and the mechanical failure of the component, at least some of the farming operations performed by the farming machine; and
  performing, by the farming machine while configured to operate in the remedial operational state, the selected solution operation.

13. The system of claim 12, wherein the selected solution operation comprises:
  performing, by the farming machine, a sequence of potential solution operations to the operational failure of the component in a preset order until the operational failure of the component is resolved.

14. The system of claim 13, the steps further comprising:
  responsive to determining, by the farming machine, that the sequence of potential solution operations failed to resolve the operational failure of the component:
    returning, by the farming machine, to a designated location outside the field.

15. The system of claim 12, wherein detecting, by the farming machine, the operational failure of the component using measurements obtained from one or more sensors coupled to and monitoring the farming machine, comprises:
  analyzing data received from a camera of the farming machine.

16. The system of claim 12, the steps further comprising:
  verifying, by the farming machine, the selected solution operation resolved the operational failure of the component; and
  configuring, by the farming machine, the farming machine to operate in the normal operational state.

17. The system of claim 12, wherein determining the solution operation comprises referencing, by the farming machine, a data store that indexes operational failures and respective potential solution operations.

18. The system of claim 12, wherein performing the selected solution operation comprises:
  configuring, by the farming machine, the farming machine to operate in a recovery operational state to resolve the operational failure of the component by fixing the component.

19. The system of claim 12, wherein performing the selected solution operation comprises:
  configuring, by the farming machine, the farming machine to operate in a redundancy operational state to resolve the operational failure of the component by employing other components of the farming machine to perform the first farming operation.

20. The system of claim 12, wherein performing the selected solution operation comprises:
  configuring, by the farming machine, the farming machine to operate in a reduced operational state to resolve the operational failure of the component by adjusting the farming operations performed by the farming machine.

* * * * *